(12) United States Patent
Kikuchi et al.

(10) Patent No.: US 9,634,587 B2
(45) Date of Patent: Apr. 25, 2017

(54) MOTOR CONTROL APPARATUS, ELECTRIC POWER STEERING APPARATUS AND VEHICLE USING THE SAME

(71) Applicant: NSK LTD., Shinagawa-ku, Tokyo (JP)

(72) Inventors: Yusuke Kikuchi, Kanagawa (JP); Atsushi Horikoshi, Kanagawa (JP); Satoshi Ozaki, Kanagawa (JP); Yoshihiro Aosaki, Kanagawa (JP); Takeshi Senba, Gunma (JP); Hisayoshi Koiwai, Gunma (JP); Shigeo Shinohara, Gunma (JP); Kenji Mori, Kanagawa (JP); Masahiro Okutani, Gunma (JP); Takaaki Sekine, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/899,051

(22) PCT Filed: Dec. 13, 2013

(86) PCT No.: PCT/JP2013/007357
§ 371 (c)(1),
(2) Date: Dec. 16, 2015

(87) PCT Pub. No.: WO2014/203300
PCT Pub. Date: Dec. 24, 2014

(65) Prior Publication Data
US 2016/0134212 A1 May 12, 2016

(30) Foreign Application Priority Data

Jun. 17, 2013 (JP) .................................. 2013-126797

(51) Int. Cl.
*H02P 6/12* (2006.01)
*B62D 5/04* (2006.01)
(Continued)

(52) U.S. Cl.
CPC .............. *H02P 6/12* (2013.01); *B62D 5/0484* (2013.01); *B62D 5/0487* (2013.01);
(Continued)

(58) Field of Classification Search
CPC ....... B62D 5/0463; B62D 5/0484; B62D 5/04
See application file for complete search history.

(56) References Cited

U.S. PATENT DOCUMENTS

2002/0177932 A1* 11/2002 Kifuku ................. B62D 5/0463
701/41
2003/0146025 A1* 8/2003 Kamen .................. A63C 17/12
180/65.1

(Continued)

FOREIGN PATENT DOCUMENTS

CN         1215944 A     5/1999
CN       101953047 A     1/2011

(Continued)

OTHER PUBLICATIONS

International Preliminary Report on Patentability (PCT/IB/338 & PCT/IB/373) issued in PCT Application No. PCT/JP2013/007357 dated Dec. 30, 2015, including English-translation of document C2 (Japanese-language Written Opinion (PCT/ISA/237)) previously filed on Dec. 16, 2015 (seven (7) pages).

(Continued)

*Primary Examiner* — Shawki S Ismail
*Assistant Examiner* — Muhammad S Islam
(74) *Attorney, Agent, or Firm* — Crowell & Moring LLP

(57) ABSTRACT

A motor control apparatus includes a motor current shutoff unit inserted between a multi-phase inverter circuit and a multi-phase electric motor to shut off a current for each of plural phases, the inverter circuit including an arm for each of the plural phases, a redundant arm unit including one or more arms, a connection selecting unit selecting which one (Continued)

of windings of the electric motor is to be connected to each of the one or more arms of the redundant arm unit, an abnormal arm detection unit detecting an abnormality in each of the plural phases of the inverter circuit, and an abnormality control unit shutting off connection between an abnormal arm and the motor when the abnormal arm detection unit detects the abnormal arm, and connecting the one or more arms of the redundant arm unit to a winding of the motor shut off.

12 Claims, 8 Drawing Sheets

(51) Int. Cl.
| | | |
|---|---|---|
| *H02P 27/06* | (2006.01) | |
| *H02M 7/5387* | (2007.01) | |
| *H02H 7/122* | (2006.01) | |
| *H02P 6/08* | (2016.01) | |
| *H02P 6/14* | (2016.01) | |
| *H02P 21/22* | (2016.01) | |
| *H02M 1/32* | (2007.01) | |
| *H02H 7/08* | (2006.01) | |

(52) U.S. Cl.
CPC ...... *H02H 7/1225* (2013.01); *H02M 7/53871* (2013.01); *H02P 6/085* (2013.01); *H02P 6/14* (2013.01); *H02P 21/22* (2016.02); *H02P 27/06* (2013.01); *H02H 7/0844* (2013.01); *H02M 2001/325* (2013.01)

(56) References Cited

U.S. PATENT DOCUMENTS

| | | | | |
|---|---|---|---|---|
| 2006/0219470 | A1 | 10/2006 | Imagawa et al. | |
| 2006/0261749 | A1* | 11/2006 | Campbell | H02P 29/0241 |
| | | | | 315/291 |
| 2007/0176577 | A1 | 8/2007 | Kezobo et al. | |
| 2009/0096394 | A1* | 4/2009 | Taniguchi | H02M 1/32 |
| | | | | 318/400.09 |
| 2009/0267551 | A1* | 10/2009 | Shibata | H02P 6/24 |
| | | | | 318/400.21 |
| 2010/0289439 | A1 | 11/2010 | Kitanaka et al. | |
| 2011/0074323 | A1 | 3/2011 | Mukai | |
| 2012/0086373 | A1* | 4/2012 | Kudanowski | B62D 5/046 |
| | | | | 318/400.22 |
| 2012/0170343 | A1 | 7/2012 | Takahashi | |
| 2013/0090809 | A1* | 4/2013 | Kuroda | B62D 5/0481 |
| | | | | 701/41 |
| 2013/0194840 | A1 | 8/2013 | Huselstein et al. | |
| 2014/0092655 | A1 | 4/2014 | Igarashi et al. | |

FOREIGN PATENT DOCUMENTS

| | | |
|---|---|---|
| EP | 2 037 566 A1 | 3/2009 |
| EP | 2 255 839 A1 | 12/2010 |
| EP | 2 574 520 A2 | 4/2013 |
| JP | 62-77875 A | 4/1987 |
| JP | 2003-219676 A | 7/2003 |
| JP | 2005-153780 A | 6/2005 |
| JP | 2006-314184 A | 11/2006 |
| JP | 2008-236993 A | 10/2008 |
| JP | 2008-295122 A | 12/2008 |
| JP | 2009-171769 A | 7/2009 |
| JP | 2011-188653 A | 9/2011 |
| JP | 4998836 B2 | 8/2012 |
| WO | WO 2005/091488 A1 | 9/2005 |
| WO | WO 2011/033567 A1 | 3/2011 |
| WO | WO 2012/004488 A1 | 1/2012 |
| WO | WO 2012/077187 A1 | 6/2012 |

OTHER PUBLICATIONS

Chinese-language Office Action issued in counterpart Chinese Application No. 201380002515.9 dated Jun. 1, 2016 (6 pages).
International Search Report (PCT/ISA/210) issued in PCT Application No. PCT/JP2013/007357 dated Mar. 18, 2014 with English-language translation (four (4) pages).
Japanese-language Written Opinion (PCT/ISA/237) issued in PCT Application No. PCT/JP2013/007357 dated Mar. 18, 2014 (four (4) pages).
Japanese Office Action issued in counterpart Japanese Application No. 2013-126797 dated Mar. 18, 2014 with English-language translation (seven (7) pages).
European Search Report issued in counterpart European Application No. 13887221.3 dated Feb. 1, 2017 (15 pages).

\* cited by examiner

MOTOR CONTROL APPARATUS, ELECTRIC POWER STEERING APPARATUS AND VEHICLE USING THE SAME

TECHNICAL FIELD

The present disclosure relates to a motor control apparatus for controlling driving of a multi-phase electric motor mounted on a vehicle, an electric power steering apparatus and a vehicle using the same.

BACKGROUND ART

There is a request for a motor control apparatus that controls driving of an electric motor for an electric power steering apparatus mounted on a vehicle, an electric motor for an electric brake device, an electric drive motor for an electric vehicle or a hybrid vehicle, or the like can continue the driving of these electric motors, even if there is an abnormality in a motor control system.

In order to respond the above-described request, it is proposed that a multi-phase motor winding of a multi-phase electric motor is duplicated, for example, the duplicated multi-phase motor windings are supplied with currents from individual inverter units, a control apparatus for a multi-phase rotary machine and an electric power steering using the same are provided with a failure control means that specifies a failed switching means in which an off-failure (i.e. an open failure) occurs when this failure occurs in a switching means of one of the inverter units and thus the switch means cannot be in a conduction state, and controls a switching means other than the failed switching means and a normal inverter unit other than a failed inverter unit including the failed switching means (see PTL 1, for example).

CITATION LIST

Patent Literature

PTL 1: JP 4998836 B

SUMMARY OF INVENTION

Technical Problem

In the conventional example described in PTL 1 described above, when the off-failure of the switching means occurs in one of the duplicated inverter units, the control of driving of the multi-phase rotary machine is continued with suppressing a drop in the torque by controlling the switching means other than the failed switching means in which the off-failure occurs and by correcting a q-axis current command value in the normal inverter unit to compensate for the drop in the torque caused by controlling the failed inverter unit including the failed switching means.

However, in the above-described conventional example, although it is possible to generate a sufficient torque when the off-failure occurs in the switching means of the inverter unit, an electro-magnetic brake occurs in the motor when an on-failure (a short circuit failure) occurs in the switching means of the inverter unit. Even if the motor is driven with correcting the command value of the normal switching means other than the abnormal switching means, the output torque drops because of the brake torque. Then, since a steering assist for the steering by a driver drops, a large strange feeling in steering may be given. In addition, since it is necessary to apply a large current to the inverter and the motor for cancelling the brake torque, there is unsolved problems that the large current results in overheating of the motor and the inverter and an assist duration is shorten when the short circuit failure occurs.

Therefore, the present disclosure has been made by focusing on the unsolved problems in the above-described conventional example, and it is an object of the present disclosure to provide a motor control apparatus capable of continuing to control of the driving of an electric motor without the strange feeling even in both of cases in which the open failure and the short circuit failure occur in the motor driving circuit.

Solution to Problem

In order to achieve the object, according to one aspect of an embodiment of the present invention, there is provided a motor control apparatus for controlling driving of a multi-phase electric motor. The motor control apparatus includes: a multi-phase inverter circuit including an arm configured to drive the multi-phase electric motor for each of a plurality of phases; a motor current shutoff unit inserted between the multi-phase inverter circuit and the multi-phase electric motor to shut off a current for each of the plurality of phases; a redundant arm unit including one or more arms whose number is less than the number of the plurality of phases of the multi-phase inverter circuit; and a connection selecting unit configured to select which of windings of the multi-phase electric motor is to be connected to each of the one or more arms of the redundant arm unit. In addition, the motor control apparatus includes: an abnormal arm detection unit configured to detect an abnormality in each of the plurality of phases of the multi-phase inverter circuit; and an abnormality control unit configured to control the motor current shutoff unit to shut off connection between an abnormal arm and the multi-phase electric motor when the abnormal arm detection unit detects the abnormal arm, and to control the connection selecting unit to connect at least one of the one or more arms of the redundant arm unit to a winding of the multi-phase electric motor, the winding is shut off by the motor current shutoff unit.

In addition, according to another aspect of the embodiment of the present invention, there is provided an electric power steering apparatus including the motor control apparatus described above, wherein the motor control apparatus includes an electric motor configured to generate a steering assist force to be applied to a steering mechanism.

Furthermore, according to still another aspect of the embodiment of the present invention, there is provided a vehicle including an in-vehicle multi-phase electric motor driven by the motor control apparatus described above.

Advantageous Effects of Invention

According to the embodiment of the present invention, the redundant arm unit corresponding to the arm of each phase of the multi-phase inverter circuit is provided, and when the open failure or the short circuit failure occurs in the arm of the multi-phase inverter circuit, this arm is replaced by the redundant arm unit. Therefore, it is not necessary to change the command value of the multi-phase inverter circuit from a normal-state, and it is possible to continuously control the driving of the electric motor without a strange feeling.

In addition, since the electric power steering apparatus includes the motor control apparatus having such an effect, even when the open failure or the short circuit failure occurs in the multi-phase inverter circuit for driving a multi-phase electric motor generating a steering assist force, it is possible to continue a steering assist function of the electric power steering apparatus by replacing by the redundant arm unit. Thus, it is possible to improve the reliability of the electric power steering apparatus.

Furthermore, since the vehicle includes the motor control apparatus having such an effect, even when the open failure or the short circuit failure occurs in the multi-phase inverter circuit for driving the in-vehicle multi-phase electric motor, it is possible to continuously generate a torque with the in-vehicle multi-phase electric motor by replacing by the redundant arm unit. Thus, it is possible to provide a vehicle improving the reliability of the electric motor.

DESCRIPTION OF EMBODIMENTS

A description is made below on embodiments of the present disclosure based on the drawings.

Figure 1:
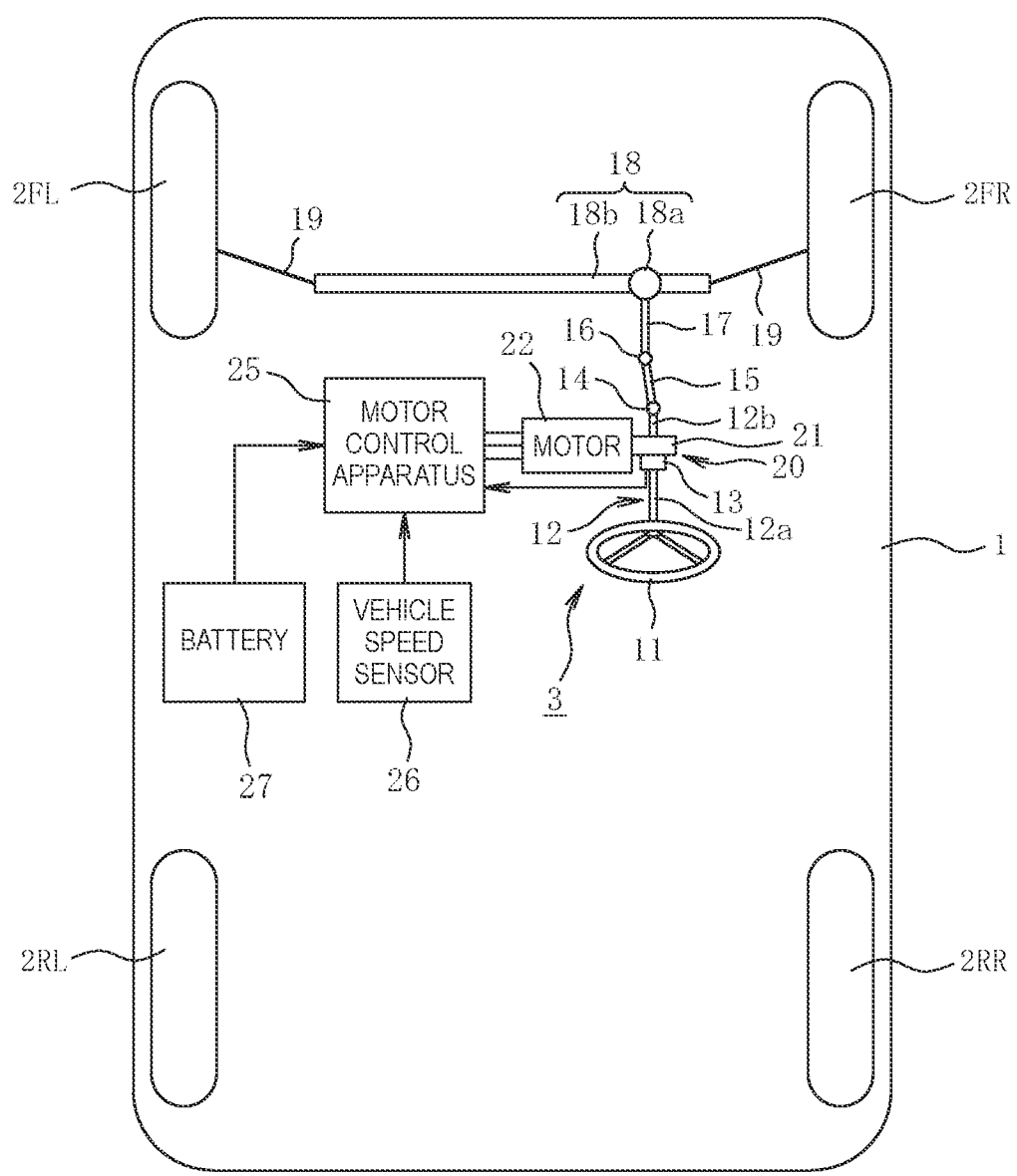
FIG. 1 is a system configuration diagram illustrating an electric power steering apparatus according to a first embodiment of the present invention.

FIG. 1 is a diagram illustrating the entire configuration of a first embodiment in which a motor control apparatus of the present disclosure is applied to an electric power steering apparatus mounted a vehicle.

A vehicle 1 according to the present disclosure includes front wheels 2FR and 2FL which are a right steered wheel and a left steered wheel, and rear wheels 2RR and 2RL. The front wheels 2FR and 2FL are steered by an electric power steering apparatus 3.

The electric power steering apparatus 3 includes a steering wheel 11. The steering force applied from a driver to the steering wheel 11 is transmitted to a steering shaft 12. The steering shaft 12 includes an input shaft 12a and an output shaft 12b. One end of the input shaft 12a is coupled to the steering wheel 11 and the other end of the input shaft is coupled to one end of the output shaft 12b via a steering torque sensor 13.

Then, the steering force transmitted to the output shaft 12b is transmitted to a lower shaft 15 via a universal joint 14, and furthermore, the steering force is transmitted to a pinion shaft 17 via a universal joint 16. The steering force transmitted to the pinion shaft 17 is transmitted to tie rods 19 via a steering gear 18 to steer the front wheels 2FR and 2FL as the steered wheels. Herein, the steering gear 18 is configured as a rack and pinion type including a pinion 18a, which is coupled to the pinion shaft 17, and a rack 18b, which is to be geared with the pinion 18a. Thus, the steering gear 18 converts the rotational motion transmitted to the pinion 18a to a linear motion in a vehicle width direction by means of the rack 18b.

The output shaft 12b of the steering shaft 12 is coupled to a steering assist mechanism 20 that transmits a steering assist force to the output shaft 12b. The steering assist mechanism 20 includes a reduction gear 21 configured as a worm gear type and coupled to the output shaft 12b and a three-phase electric motor 22 that is a multi-phase electric motor configured as, for example, a three-phase brushless motor, and is coupled to the reduction gear 21 to generate the steering assist force.

The steering torque sensor 13 detects a steering torque applied to the steering wheel 11 and transmitted to the input shaft 12a. The steering torque sensor 13 has a configuration to, for example, convert the steering torque into a torsion angle displacement of a torsion bar (not shown) inserted between the input shaft 12a and the output shaft 12b, to convert the torsion angle displacement into a resistance change or a magnetic change to detect such a change.

Figure 3:
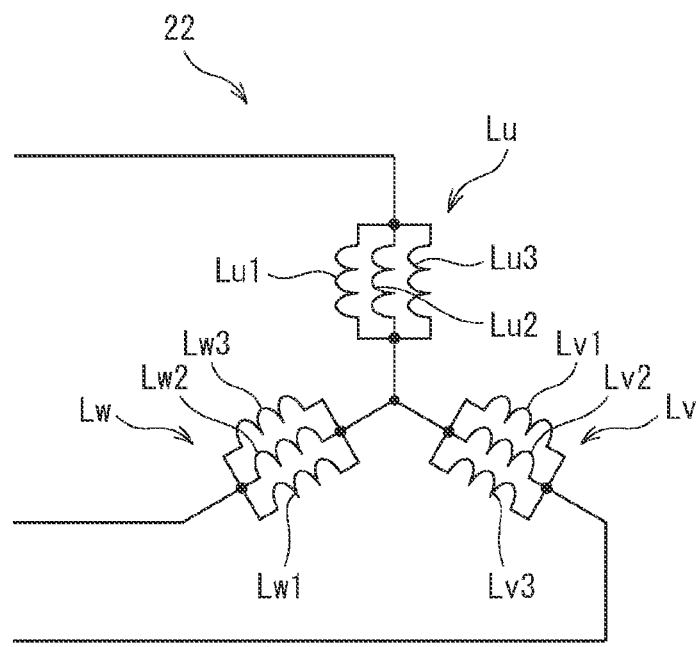
FIG. 3 is a schematic diagram illustrating a winding structure of a three-phase electric motor in the first embodiment.

Furthermore, the three-phase electric motor 22 has a configuration in which a U-phase winding Lu, a V-phase winding Lv, and a W-phase winding Lw are connected by star connection, as illustrated in FIG. 3. In each phase winding, plural (three, for example) windings L1 to L3 are wound and connected in parallel with one another. Thus, even when one or two windings Li (i=1, 2, or 3) are broken, an excitation current can flow to generate a driving torque at the three-phase electric motor 22. Therefore, it is possible to improve reliability of the three-phase electric motor 22.

Figure 2:
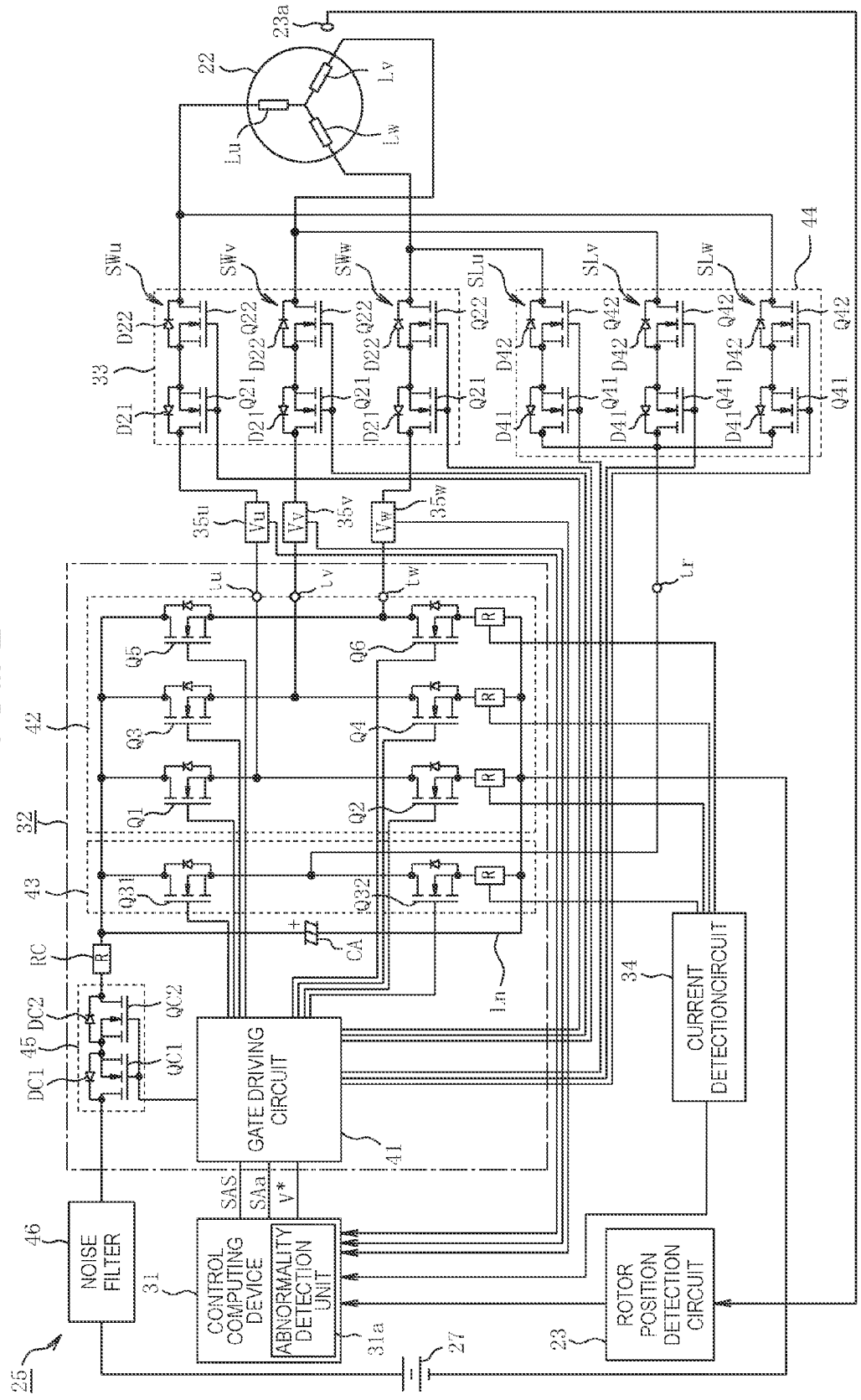
FIG. 2 is a circuit diagram illustrating a detailed configuration of a motor control apparatus in the first embodiment.

Furthermore, the three-phase electric motor 22 includes a rotational position sensor 23a such as a Hall device, for detecting a rotational position of a rotor, as illustrated in FIG. 2. The detection value outputted from the rotational position sensor 23a is supplied to a rotor position detection circuit 23. The rotor position detection circuit 23 detects a rotor position expressed in a rotor rotational angle and outputs a rotor position detection signal θm.

Then, the rotary drive of the three-phase electric motor 22 is controlled by a motor control apparatus 25.

The steering torque T detected by the steering torque sensor 13 and a vehicle speed Vs detected by a vehicle speed sensor 26 as well as the rotor rotational angle θm outputted from the rotor position detection circuit 23 are inputted to the motor control apparatus 25.

In addition, a direct current in supplied to the motor control apparatus 25 from a battery 27 as a direct current source.

The detailed configuration of the motor control apparatus 25 includes a control computing device 31, a motor driving circuit 32, and a motor current shutoff circuit 33, as illustrated in FIG. 2.

The control computing device 31 takes as an input the steering torque T detected by the steering torque sensor 13 and the vehicle speed V detected by the vehicle speed sensor 26 illustrated in FIG. 1, although not illustrated in FIG. 2. In addition, as illustrated in FIG. 2, the control computing device 31 takes as an input the rotor rotational angle θm outputted from the rotor position detection circuit 23, and furthermore, takes as an input current detection values outputted from a current detection circuit 34 indicative of respective detection values of the currents outputted from the respective phase windings Lu to Lw of the three-phase electric motor 22. Furthermore, the control computing device 31 takes as an input, output voltages of a three-phase inverter circuit 42 described later, which is outputted from voltage detection circuits 35u to 35w that individually detect phase voltages between outputs of the three-phase inverter circuit 42 of the motor driving circuit 32 and the motor current shutoff circuit 33.

Figure 5:
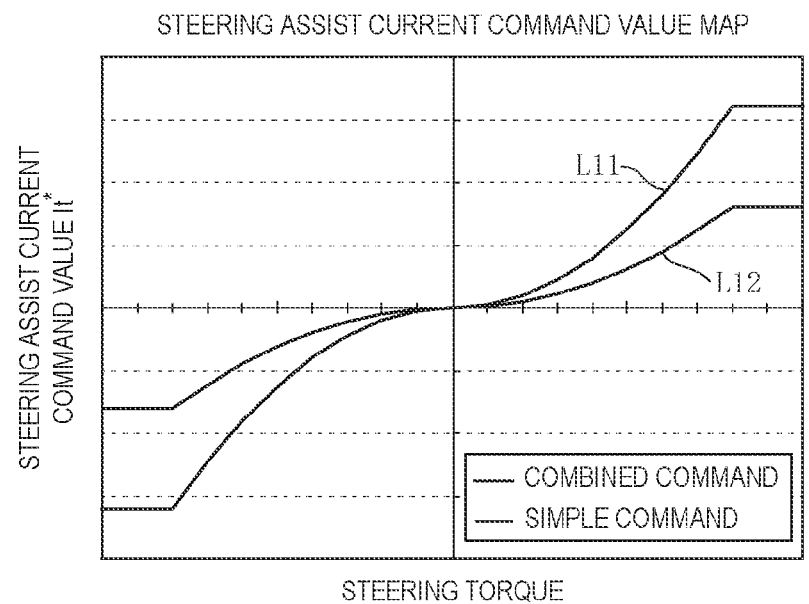
FIG. 5 is a characteristic diagram illustrating a conventional example of the relationship between a steering torque and a steering assist current command value.
Figure 6:
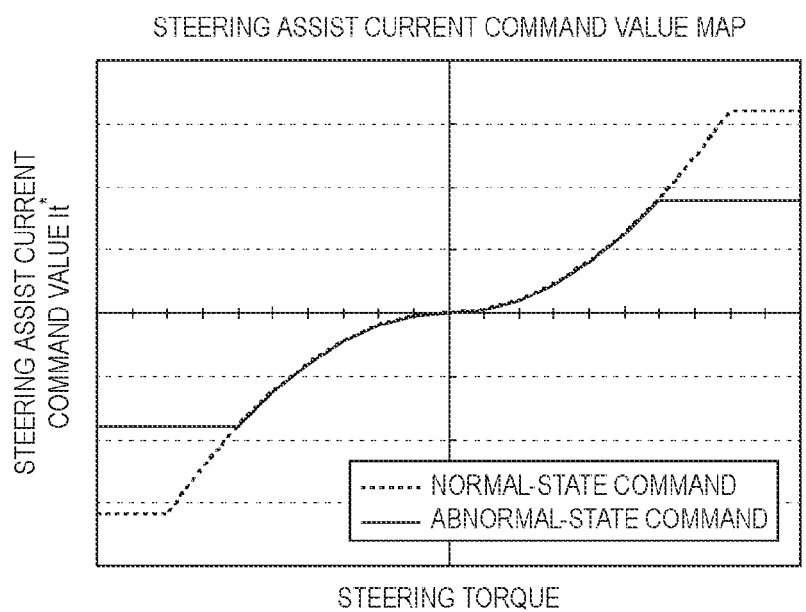
FIG. 6 is a is a characteristic diagram illustrating another conventional example of the relationship between a steering torque and a steering assist current command value.

When the motor driving circuit 32 is normal, the control computing device 31 calculates a steering assist current command value I* by referring to a normal-state steering assist current command value calculation map illustrated in FIG. 5, that is set beforehand based on the steering torque T and the vehicle speed V. When the motor driving circuit 32 is abnormal, the control computing device 31 calculates a steering assist current command values I1* and I2* by referring to an abnormal-state steering assist current command value calculation map illustrated in FIG. 6, that is set beforehand based on the steering torque T and the vehicle speed V.

In addition, the control computing device 31 calculates a target d-axis current command value Id* and a target q-axis current command value Iq* in a d-q coordinate system based on the calculated steering assist current command values I1* and I2*, and the rotor rotational angle θm, and performs dq-phase/three-phase conversion on the calculated d-axis current command value Id* and q-axis current command value Iq* to calculate a u-phase current command value Iu*, a V-phase current command value Iv*, and a W-phase current command value Iw*.

Then, the control computing device 31 calculates respective current deviations ΔIu, ΔIv, and ΔIw between the calculated u-phase current command value Iu*, V-phase current command value Iv*, and W-phase current command value Iw*, and additional values of the respective phases of the current detection value detected by the current detection circuit 34. Furthermore, the control computing device 31 performs, for example, a PI control computation or a PID control computation on the calculated current deviations ΔIu, ΔIv, and ΔIw to calculate three phases of voltage command values V* for the motor driving circuit 32 and outputs the calculated three phases of voltage command values V* to the motor driving circuit 32.

In addition, the control computing device 31 includes an abnormality detection unit 31a. The abnormality detection unit 31a detects the open failure and the short circuit failure of field-effect transistors (FETs) Q1 to Q6 as switching element included in the three-phase inverter circuit 42 by comparing respective phase current detection values Iu, Iv, and Iw inputted to the control computing device 31 with the respective phase current command values Iu*, Iv*, and Iw* calculated by itself, and by referring to phase voltage detection values Vu, Vv, and Vw.

When detecting the open failure and the short circuit failure of the field-effect transistors (FETs) Q1 to Q6 included in the three-phase inverter circuit 42, the abnormality detection unit 31a outputs to a gate driving circuit 41, an arm abnormality detection signal SAa that stops supply of gate signals to gates of the field-effect transistors Qk (k=1, 3, or 5) and Qk+1 of a phase arm (i=u, v, or w) in which the abnormality occurs. In addition, when detecting that abnormalities occur in two phases or more of the phase arms SAu to SAw of the three-phase inverter circuit 42, the abnormality detection unit 31a outputs an abnormal stop signal SAS to the gate driving circuit 41.

The motor driving circuit 32 includes the gate driving circuit 41, the three-phase inverter circuit 42, a redundant arm unit 43, a connection selecting unit 44 and a power supply shutoff circuit 45.

The gate driving circuit 41 takes as an input the three phases of voltage command values V* outputted from the control computing device 31, and the arm abnormality signal SAa and the abnormal stop signal SAS outputted from the abnormality detection unit 31a of the control computing device 31.

When the voltage command values V* are inputted from the control computing device 31, the gate driving circuit 41 forms six gate signals pulse-width modulated (PWM) based on the voltage command values V* and a carrier signal Sc of a triangular wave.

In addition, when the abnormality detection signal SAa inputted from the control computing device 31 indicates the normality, the gate driving circuit 41 outputs three high-level gate signals to the motor current shutoff circuit 33 and outputs one high-level gate signal to the power supply shutoff circuit 45.

Furthermore, when the abnormality detection signal SAa indicates a U-phase arm abnormality, the gate driving circuit 41 stops supplying the gate signals to gates of the field-effect transistors Q1 and Q2 of a U-phase arm SAu of the three-phase inverter circuit 42 and outputs a low-level gate signal to a switch unit SWu of the motor current shutoff circuit 33 to shut off the motor current. Simultaneously, the gate driving circuit starts to supply the gate signals that have been supplied to the field-effect transistors Q1 and Q2 of a U-phase arm SAu of the three-phase inverter circuit 42 to gates of transistors Q11 and Q12 that are connected in series with each other, as switching elements of the redundant arm unit 43. Simultaneously, the gate driving circuit 41 supplies the high-level gate signals to gates of field-effect transistors Q41 and Q42 that are connected in series with each other and included in a selection switch unit SLu of the connection selecting unit 44.

Furthermore, when the abnormality detection signal SAa indicates a V-phase arm abnormality (or W-phase arm abnormality), the gate driving circuit 41 stops supplying the gate signals to gates of the field-effect transistors Q3 and Q4 of a V-phase arm SAv (or the field-effect transistors Q5 and Q6 of a W-phase arm SAw) of the three-phase inverter circuit 42. Simultaneously, the gate driving circuit 41 outputs a low-level gate signal to a switch unit SWv (or SWw) of the motor current shutoff circuit 33 to shut off the motor current. Furthermore, the gate driving circuit starts to supply gate signals that have been supplied to the field-effect transistors Q3 and Q4 of a V-phase arm SAv (or the field-effect transistors Q5 and Q6 of a W-phase arm SAw) of the three-phase inverter circuit 42 to gates of the field-effect transistors Q11 and Q12 that are connected in series with each other, as the switching elements of the redundant arm unit 43. Simultaneously, the gate driving circuit 41 supplies the high-level gate signals to gates of field-effect transistors Q41 and Q42 that are connected in series with each other and included in a selection switch unit SLv (or SLw) of the connection selecting unit 44.

Furthermore, when the gate driving circuit 41 takes as an input the abnormal stop signal SAS that indicates that abnormalities occur in the two or more phases of the phase arms SAu to SAw of the three-phase inverter circuit 42, from the abnormality detection unit 31a of the control computing device 31, the gate driving circuit 41 outputs the low-level gate signals to two field-effect transistors QC1 and QC2 included in the power supply shutoff circuit 45 to shutoff the current supply from the battery 27 to the three-phase inverter circuit 42.

The three-phase inverter circuit 42 is connected to the battery 27 via the power supply shutoff circuit 45 and a noise filter 46.

The three-phase inverter circuit 42 includes field-effect transistors (FETs) Q1 to Q6 as six switching elements and a configuration in which the U-phase arm SAu, the V-phase arm SAv, and the W-phase arm SAw, each of which includes the two field-effect transistors connected in series with each other, are connected in parallel with one another. Then, by inputting the gate signals outputted from the gate driving circuit 41 to gates of the respective field-effect transistors Q1 to Q6, a U-phase current Iu, a V-phase current Iv, and a W-phase current Iw are outputted from between the field-effect transistors of the respective phase arms SAu, SAv, and SAw to the three-phase motor windings Lu, Lv, and Lw of the three-phase electric motor 22, via the motor current shutoff circuit 33.

In addition, voltages between both ends of shunt resistances Ru, Rv, and Rw inserted between a ground and lower arms of the respective phase arms SAu, SAv, and SAw of the three-phase inverter circuit 42 are inputted to the current detection circuit 34, and the current detection circuit 34 detects the motor currents Iu, Ivm, and Iw.

In addition, the motor current shutoff circuit 33 includes the U-phase switch units SWu, the V-phase switch units SWv, and the W-phase switch units SWw. The U-phase switch unit SWu is inserted between a U-phase output terminal to of the three-phase inverter circuit 42 and the motor winding Lu, the V-phase switch unit SWv is inserted between a V-phase output terminal tv of the three-phase inverter circuit 42 and the motor winding Lv, and the W-phase switch unit SWw is inserted between a W-phase output terminal tw of the three-phase inverter circuit 42 and the motor winding Lw.

As illustrated in FIG. 2, each of the switch units SWu to SWw includes two field-effect transistors (FETs) Q21 and Q22 connected such that the directions of parasitic diodes D21 and D22 are opposite to each other. For example, sources of the field-effect transistors are connected with each other such that anodes of the parasitic diodes are connected with each other. The above-mentioned gate signals are supplied from the gate driving circuit 41 to gates of the respective field-effect transistors Q21 and Q22.

In addition, the power supply shutoff circuit 45 includes a series circuit configuration in which sources of the two field-effect transistors (FETs) QC1 and QC2 are connected with each other such that the direction of the parasitic diodes D21 and D22 are opposite to each other and the anodes thereof are connected with each other. Then, a drain of the field-effect transistor QC1 is connected with an output side of the noise filter 46 and a drain of the field-effect transistor QC2 is connected to drains of the field-effect transistors Q1, Q3, and Q5 of the three-phase inverter circuit 42 and a drain of a field-effect transistor Q31 of the redundant arm unit 43, via a resistance RC.

The redundant arm unit 43 has the same configuration with one phase of the respective phase arms SAu to SAw of the three-phase inverter circuit 42. The redundant arm unit is connected to the three-phase inverter circuit 42 in parallel therewith, and has a configuration in which field-effect transistors Q31 and Q32 are connected in series with each other. Then, a shunt resistance RR is inserted between the field-effect transistor Q32 as a lower arm and a negative side line Ln connected to the negative side of the battery 27. A motor current Ir detected at the shunt resistance RR is supplied to the current detection circuit 34.

In addition, a connection point of the field-effect transistors Q31 and Q32 of the redundant arm unit 43 is connected with an output terminal tr. The output terminal tr is connected with the connection selecting unit 44.

Furthermore, a smoothing electrolytic capacitor CA is inserted between a negative line Lm and a connection point of the resistance Rc of the power supply shutoff circuit 45 and the field-effect transistor Q31 of the redundant arm unit 43.

As illustrated in FIG. 2, the connection selecting unit 44 includes the three switch units SLu, SLv, and SLw, each of which has one end inserted between the output terminal tr of the redundant arm unit 43 and each of the motor windings Lu, Lv, and Lw of the three-phase electric motor 22, respectively.

The one end of the switch unit SLu is connected with the output terminal tr of the redundant arm unit 43, and the other end of the switch unit SLu is connected with a connection point of the motor winding Lu of the three-phase electric motor 22 and the motor current shutoff circuit 33.

The one end of the switch unit SLv is connected with the output terminal tr of the redundant arm unit 43, and the other end of the switch unit SLv is connected with a connection point of the motor winding Lv of the three-phase electric motor 22 and the motor current shutoff circuit 33.

The one end of the switch unit SLw is connected with the output terminal tr of the redundant arm unit 43, and the other end of the switch unit SLw is connected with a connection point of the motor winding Lw of the three-phase electric motor 22 and the motor current shutoff circuit 33.

Similarly to the motor current shutoff circuit 33, each of the switch units SLu to SLw includes two field-effect transistors (FETs) Q31 and Q32 connected such that the directions of parasitic diodes D31 and D32 are opposite to each other. For example, sources of the field-effect transistors are connected with each other such that anodes of the parasitic diodes are connected with each other. The above-described gate signals are supplied from the gate driving circuit 41 to gates of the field-effect transistors Q31 and Q32.

Next, an operation of the first embodiment will be described.

In an operation-stopped state in which an ignition switch (not illustrated) is in an OFF state, the vehicle stops, and a steering assist control processing stops, the control computing device 31 of the motor control apparatus 25 is in a non-operating state. Thus, the steering assist control processing and an abnormality monitoring processing performed by the control computing device 31 stop. Therefore, the operation of the three-phase electric motor 22 stops, and the output of the steering assist force from the steering assist mechanism 20 to the output shaft 12b of the steering shaft 12 stops.

When the ignition switch is turned to an ON state from the operation-stopped state, the control computing device 31 is turned to an operating state to start the steering assist control processing and the abnormality monitoring processing. It is assumed that a current state is a normal state in which there is none of an open failure nor a short circuit failure in the respective field-effect transistors Q1 to Q6 in the three-phase inverter circuit 42 of the motor driving circuit 32.

Figure 4:
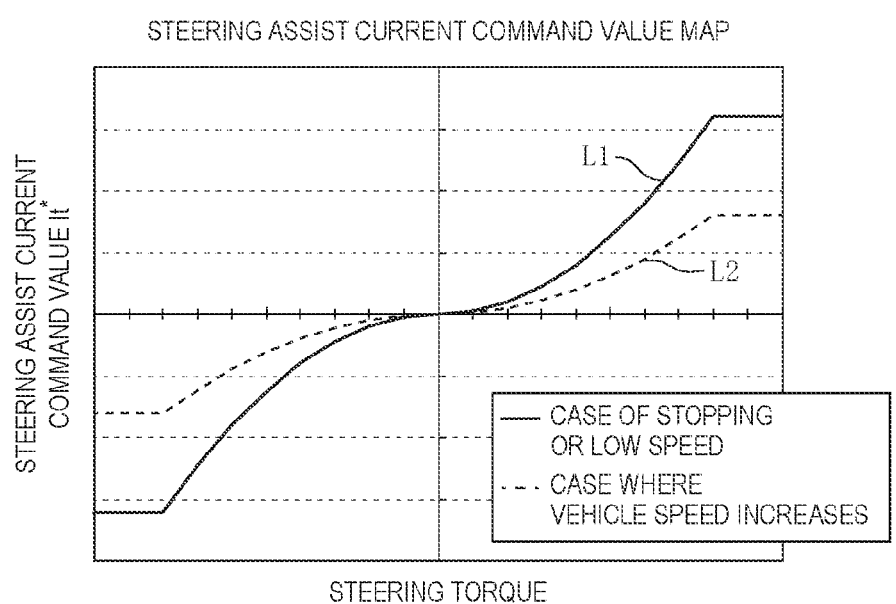
FIG. 4 is a characteristic diagram illustrating a relationship between a steering torque and a steering assist current command value.

In this case, since the steering torque T is "0" and the vehicle speed V is also "0" in the steering assist control processing performed by the control computing device 31 in a non-steering state in which the steering wheel 1 is not steered, the steering assist current command value It* is calculated by referring the steering assist current command value calculation map illustrated in FIG. 4.

Then, the control computing device 31 calculates the d-axis current command value Id* and the q-axis current command value Iq* based on the calculated steering assist current command value I* and the rotor rotational angle θm input from the rotor position detection circuit 23, and performs dq two-phase/three-phase conversion on the calculated d-axis current command value Id* and q-axis current command value Iq* to calculate the u-phase current command value Iu*, the V-phase current command value Iv*, and the W-phase current command value Iw*.

Furthermore, the control computing device 31 calculates the current deviations ΔIu, ΔIv, and ΔIw by subtracting the respective phase current detection values Iu, Iv, and Iw detected by the current detection circuit 34 from the respective current command values Iu*, Iv*, and Iw*, and performs the PI control processing or the PID control processing on the calculated current deviations ΔIu, ΔIv, and ΔIw to calculate target voltage command values Vu*, Vv*, and Vw*.

Then, the control computing device 31 outputs the calculated target voltage command values Vu*, Vv*, and Vw* to the gate driving circuit 41 of the motor driving circuit 32, as the target voltage command values V*.

In addition, since the three-phase inverter circuit 42 is normal, the control computing device 31 outputs the abnormality detection signal SAa and the abnormal stop signal indicative of a normality to the gate driving circuit 41.

Therefore, the gate driving circuit 41 outputs the three high-level gate signals to the motor current shutoff circuit 33. Thus, the field-effect transistors Q21 and Q22 included in the switch units SWu to SWw of the motor current shutoff circuit 33 are in the ON state, the output terminals tu, tv, and tw of the three-phase inverter circuit 42 are electrically conducted to the three-phase windings Lu, Lv, and Lw of the three-phase electric motor 22, respectively, and thus, energization of the three-phase electric motor 22 can be controlled.

Simultaneously, the gate driving circuit 41 outputs the high-level gate signal to the power supply shutoff circuit 45. Thus, the field-effect transistors QC1 and QC2 of the power supply shutoff circuit 45 are in the ON state, and a direct current from the battery 27 is supplied to the three-phase inverter circuit 42 via the noise filter 46.

Furthermore, since the three-phase inverter circuit 42 is normal, the gate driving circuit 41 outputs the low-level gate signals to the switch units SLu, SLv, and SLw of the connection selecting unit 44. Thus, the field-effect transistors Q31 and Q32 of each of the switch units SLu to SLw of the connection selecting unit 44 are in the OFF state, the current paths between the redundant arm unit 43 and the motor windings Lu to Lw of the three-phase electric motor 22 are broken.

Furthermore, the gate driving circuit 41 forms the gate signals by pulse width modulation based on the voltage command values V* inputted from the control computing device 31 to supply the formed gate signals to the gates of the field-effect transistors Q1 and Q6 of the three-phase inverter circuit 42. In this situation, the supply of gate signals to the gates of the field-effect transistors Q31 and Q32 of the redundant arm unit 43 is stopped.

Therefore, since the steering torque Ts is "0" in a state in which the vehicle in a stop state and the steering wheel 1 is not steered, the steering assist current command value It* is "0" and a stop state of the three-phase electric motor 22 is maintained. However, the steering torque Ts becomes larger in so-called "stationary steering" in which the steering wheel 1 is steered in the stop state of the vehicle or in starting of travelling of the vehicle.

Thus, the control computing device 31 calculates the target steering assist current command value It* having a larger value by referring to the characteristic curve L1 indicated by a solid line in FIG. 4, and a larger voltage command values V* corresponding thereto is supplied to the gate driving circuit 41. Therefore, the gate signals with a duty ratio corresponding to the larger voltage command values V* from the gate driving circuit 41 are outputted to the three-phase inverter circuit 42. The three-phase inverter circuit 42 outputs the U-phase current Iu, the V-phase current Iv, and the W-phase current Iw corresponding to the target steering assist current command value It* and having a phase difference of 120 degrees from one another. The U-phase current, the V-phase current, and the W-phase current are supplied to the three-phase windings Lu, Lv, and Lw of the three-phase electric motor 22, respectively, via the field-effect transistors Q21 and Q22 of each of the switch units SWu, SWv, and SWw of the corresponding phase in the motor current shutoff circuit 33.

Accordingly, the three-phase electric motor 22 is driven to rotate so as to generate a larger steering assist force corresponding to the target steering assist current value It* depending on the steering torque Ts. This steering assist force is transmitted to the output shaft 12b via the reduction gear 21. Therefore, the steering wheel 11 can be steered with a small steering force.

Then, when the vehicle speed Vs increases, the control computing device 31 selects, for example, a characteristic curve L2 indicated by a dot line in the steering assist current command value calculation map illustrated in FIG. 4. Therefore, the target steering assist current command value It* calculated by the control computing device 31 becomes smaller than that in stationary steering, and generates a moderately-reduced steering assist force depending on the steering torque Ts and the vehicle speed Vs.

In this way, in a case where the three-phase inverter circuit 42 is normal and the motor current Iu, Iv, and Iw supplied to the three-phase electric motor 22 are normal, a most suitable motor current for the steering torque Is and the vehicle speed Vs are supplied to the three-phase electric motor 22.

When a short circuit failure occurs from the normal state of the three-phase inverter circuit 42, for example, in any one of the field-effect transistors Q2, Q4, and Q6 of the lower arm side of the three-phase inverter circuit 42 in a state in which the respective phase coils Lu to Lw of the three-phase electric motor 22 are supplied with currents, the motor current Ii (i=u, v, or w) outputted from the phase arm SAi in which the short circuit failure occurs to the motor current shutoff circuit 33 does not flow. Therefore, the phase detection voltage Vi detected by the voltage detection unit 35i drops almost to the ground potential, and thus it is possible to determine that the abnormality occurs due to the short circuit failure.

Similarly, when an open failure occurs in any one of the field-effect transistors Q1, Q3, and Q5 included in the upper arm of the three-phase inverter circuit 42, it is possible to detect the open failure in a similar way.

Furthermore, when the short circuit failure occurs in any one of the field-effect transistors Q1, Q3, and Q5 included in the upper arm of the three-phase inverter circuit 42, the voltage of the corresponding voltage detection unit 35i maintains to be high. Therefore, it is possible to determine the short circuit failure based on the detected voltage.

In this way, when the short circuit failure or the open failure occurs in any phase arm SAi of the inverter circuit 42 of the motor driving circuit 32, the abnormality detection signal SAa outputted from the abnormality detection unit 31a is set depending on the phase arm SAi in which the failure occurs. Therefore, the gate driving circuit 41 can identify the abnormal phase arm Sai, since the inputted abnormality detection signal SAa indicates the arm abnormality other than the normality.

Thus, when the abnormality occurs, for example, in the U-phase arm SAu, the abnormality detection signal SAa indicative of a U-phase arm abnormality is inputted from the abnormality detection unit 31a to the gate driving circuit 41. Accordingly, the gate driving circuit 41 stops outputting the gate signal to the gate of the U-phase arm SAu, and the low-level gate signals are outputted to the gates of the field-effect transistors Q21 and Q22 of the U-phase switch unit SWu of the motor current shutoff circuit 33.

Thus, the U-phase switch SWu is controlled to be in the OFF state. In this situation, since the U-phase switch unit SWu has a configuration in which the field-effect transistors Q21 and Q22 are connected such that the directions of parasitic diodes D21 and D22 are opposite to each other, a bidirectional current flowing across the U-phase switch unit SWi is surely shut off.

After the shutoff, the gate driving circuit 41 starts to supply the gate signals that have been supplied to the gates of the field-effect transistors Q1 and Q2 of a U-phase arm SAu of the three-phase inverter circuit 42 until now to the gates of the field-effect transistors Q31 and Q32 of the redundant arm unit 43. Simultaneously, the gate driving circuit 41 supplies the high-level gate signals to the gates of the field-effect transistors Q41 and Q42 included in the U-phase switch unit SLu of the connection selecting unit 44.

Therefore, the redundant arm unit 43 is driven and controlled instead of the abnormal U-phase arm SAu, the motor current Ir outputted from the output terminal tr of the redundant arm unit 43 is supplied to the motor winding Lu of the three-phase electric motor 22 as the motor current Iu via the U-phase switch unit SLu of the connection selecting unit 44.

As a result, the U-phase current Iu is supplied from the redundant arm unit 43 instead of the U-phase arm SAu of the three-phase inverter circuit 42. Thus, it is possible to continue motor current supply to the three-phase electric motor 22 equivalent to that before the abnormality occurs in the U-phase arm SAu.

In this situation, the target current command value calculation map for calculation the target current command value It* by the control computing device 31 can be used as it is, and it is not necessary to separately prepare another target current command value calculation map for an abnormal-state. Furthermore, since the configuration of the redundant arm unit 43 is the same with the arm configuration of one phase of the three-phase inverter circuit 42, it is possible to control the motor current to be completely unchanged from the normal-state to avoid giving a strange feeling to the driver.

Similarly, when the short circuit failure or the open failure occurs in the V-phase arm SAv (or W-phase arm SAw) in the multi-phase inverter circuit 42, the abnormality detection unit 31a detects the failure, the abnormality detection signal SAa indicates a V-phase arm abnormality (or, W-phase arm abnormality), and the gate driving circuit 41 can identify the arm in which the abnormality occurs.

Therefore, the gate driving circuit 41 supplies the gate signals have been supplied to the gates of the field-effect transistors Q3 and Q4 (or Q5 and Q6) of the V-phase arm SAv (or W-phase arm SAw) to the field-effect transistors Q31 and Q32 of the redundant arm unit 43. Simultaneously, the gate driving circuit 41 controls the V-phase switch unit SWv (or W-phase switch unit SWw) of the motor current shutoff circuit 33 to be in the OFF state, and controls the V-phase switch unit SLv (or W-phase switch unit SLw) of the connection selecting unit 44 to be in the ON state.

Accordingly, similarly as described above, the driving of the abnormal arm of the three-phase inverter circuit 42 is stopped, and the current path to the three-phase electric motor 22 is broken. Instead of them, the V-phase current Iv (or, W-phase current Iw) is supplied from the redundant arm unit 43 to the motor winding Lv (or Lw) of the three-phase electric motor 22. Therefore, it is possible to supply the completely same motor current to that in the normal-state to the three-phase electric motor 22 to continue the driving of the three-phase electric motor 22 and generate a necessary steering assist force.

In this way, according to the above-described embodiment, when the abnormality occurs in the phase arm SAi of the three-phase inverter circuit 42, the driving of the phase arm SAi in which the abnormality occurs is stopped and the current path to the motor winding Li of the three-phase electric motor 22 is broken. Then, since the phase arm for which the driving is stopped is replaced by the redundant arm unit 43, the control manner does not change before and after the occurrence of the abnormality and the control of the motor current does not change. Since it is possible to continue the steering assist without generating the electromagnetic brake of motor when the abnormality occurs, a strange feeling is not given to the driver.

Furthermore, it is not necessary to change the current command value calculation map between the normal-state and other states, and it is possible to secure a motor output characteristic similar to that in the normal-state. Therefore, an abnormal overheating of the three-phase electric motor 22 and the three-phase inverter circuit 42 is not caused, and it is possible to secure the vibration level and the noise level similar to those in a normal operation state even after the failure occurs.

In addition, since it is possible to minimize a torque difference in switching from the three-phase inverter circuit 42 to the redundant arm unit 43 when the abnormality occurs, it is possible to reduce the strange steering feeling of the driver to the minimum.

Furthermore, the conventional example described above needs a configuration in which the electric motor has two systems of motor winding terminals. The wire connections in the motor become complex and the size of the motor becomes larger because of an increase of components necessary for the wire connections. Therefore, in the conventional example, also as to an ECU forming the control computing device, a motor interface unit becomes complex, the number of components increases, and the size increases. However, in the present embodiment, it is not necessary to tailor the three-phase electric motor and the configuration of the interface unit of the ECU can be maintained without changing the existing configuration.

Furthermore, since a special motor specification is not required, there is no restriction on a layout of the coils or the other magnetic circuit configuration and it is possible to adapt a most suitable magnetic circuit design. It is possible to suppress an influence of torque ripples and an electromagnetic vibration to the minimum to obtain a good motor characteristics as well as a good steering performance.

In addition, unlike the above-described conventional example, it is not necessary to provide plural systems of inverter circuits, and thus it is not necessary to control synchronization between the systems. As to a measure against conduction of a noise due to switching and against a radiation noise, it is possible to address them without a significant change from an ordinary circuit configuration.

However, when a new abnormality further occurs in the phase arm of the three-phase inverter circuit 42 in an abnormal control state in which the redundant arm unit 43 has been used already, there is no redundant arm unit 43 dealing with the new abnormality. Therefore, when the gate driving circuit 41 takes as an input the abnormality stop signal SAS from the abnormality detection unit 31a, the gate driving circuit 41 stops the driving of the respective phase arms SAu to SAw of the three-phase inverter circuit 42, and makes the respective phase switch units SWu to SWw of the motor current shutoff circuit 33 to be in the OFF state. Furthermore, the gate driving circuit 41 stops the driving of the redundant arm unit 43, and makes the respective phase switch units SLu to SLw of the connection selecting unit 44 to be in the OFF state. Simultaneously, the gate driving circuit 41 makes the gate signals to the field-effect transistors QC1 and QC2 of the power supply shutoff circuit 45 to be the Low-level to control the power supply shutoff circuit 45 to be in a state in which power supply is shut off. Since the field-effect transistors QC1 and QC2 of the power supply shutoff circuit 45 are also connected such that the directions of parasitic diodes are opposite to each other, it is possible to surely shut off the bidirectional current.

Similarly, since the redundant arm unit 43 cannot address short circuit failures that occur in the two field-effect transistors included the respective phase arm SAu to SAw of the three-phase inverter circuit 42, the power supply shutoff circuit 45 shuts off the power supply to the three-phase inverter circuit 42 in a similar way.

It is to be noted that, when the motor driving circuit is duplicated similarly to the conventional example described above, the target steering assist current command value It* is calculated with a characteristic line L11 indicated by a solid line in the target steering assist current command value calculation map illustrated in FIG. 5 in the normal-state, and the target steering assist current command value It* is divided into two halves for individual motors and supplied, as illustrated by the characteristic line L12 indicated by the a dot line. However, when the abnormality occurs in one of the motor driving circuits, it is sometimes necessary to calculate the target steering assist current command value for the abnormal state by preparing another target steering assist current command value calculation map for the abnormal state. This makes the control complicated, and it is not possible to control the motor current in the same way as the normal-state.

Furthermore, when a motor current shutoff circuit is provided between the duplicated motor driving circuits and the three-phase electric motor and the motor current shutoff circuit is configured to cut off one of the motor driving circuits in which an abnormality occurs when the abnormality occurs in the one of the motor driving circuits, it is possible to calculate the target steering assist current command value with the same characteristic line in both of the normal-state and the abnormal-state. However, the maximum driving current in the abnormal-state is restricted and it is not possible to control the motor current in the same way as the normal-state.

Next, the second embodiment of the present invention will be described with reference to FIG. 7.

In the second embodiment, the power supply shutoff circuit of the above-described first embodiment is duplicated.

Figure 7:
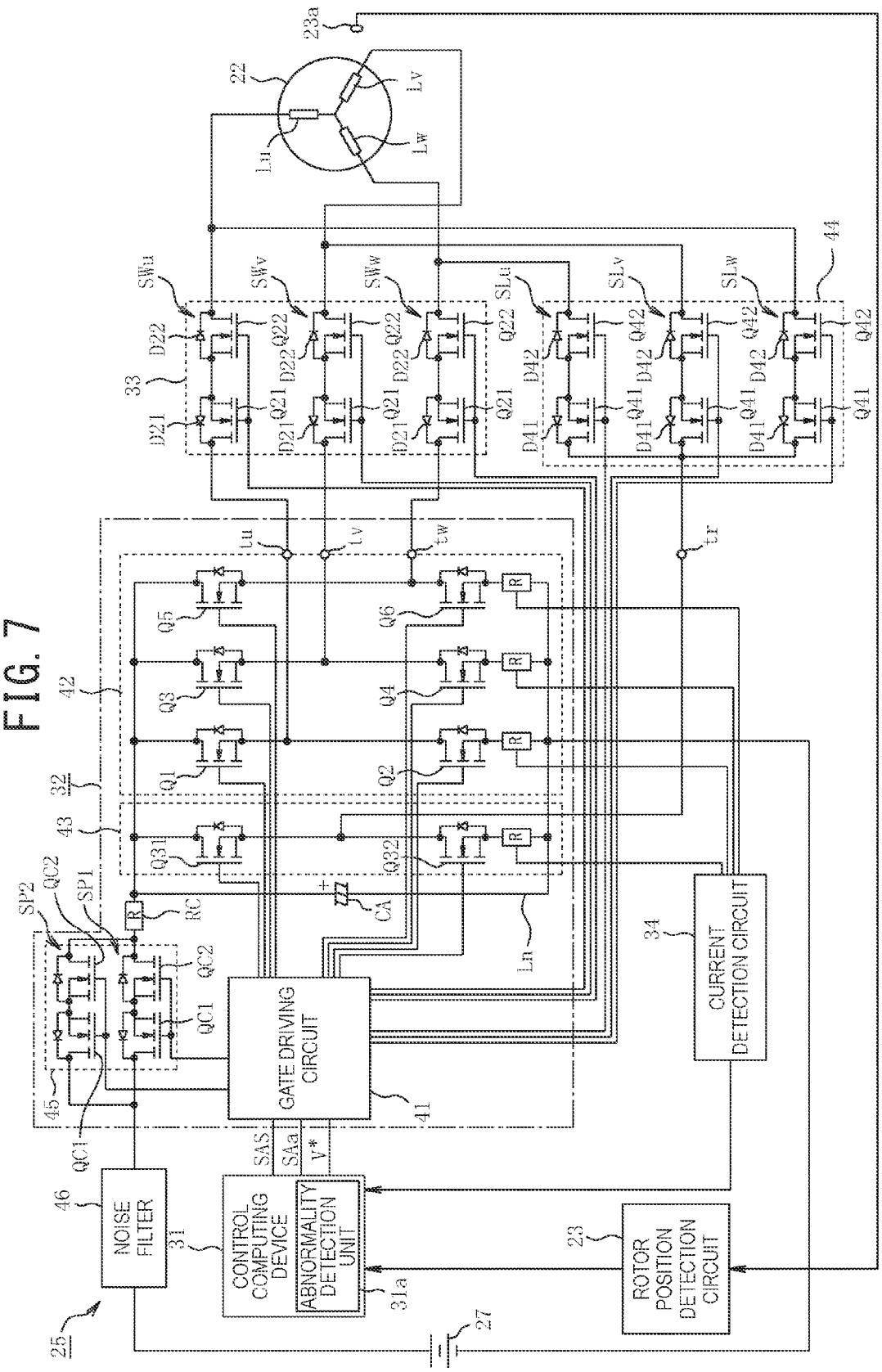
FIG. 7 is a circuit diagram illustrating a second embodiment of the present invention.

That is, the second embodiment has the same configuration to that of the above-described first embodiment with the exception that the power supply shutoff circuit 45 inserted between the battery 27, and the three-phase inverter circuit 42 and the redundant arm unit 43 is duplicated as illustrated in FIG. 7. It is to be noted that the voltage detection circuit 35u to 35w are not illustrated in FIG. 7.

The power supply shutoff circuit 45 has a configuration in which a first switch unit SP1 including the field-effect transistors QC1 and QC2 in the above-described first embodiment and a second switch unit SP2 similarly including field-effect transistors QC11 and QC12 are connected in parallel with each other. Then, the gate signals is supplied from the gate driving circuit 41 to the gates of the field-effect transistors, QC1, QC2, QC11, and QC12 of the respective switch units SP1 and SP2.

Herein, the noise filter 46 and the resistance 46 are commonly used for the switch units SP1 and SP2 so as to reduce the number of components accordingly.

According to the second embodiment, the power supply shutoff circuit 45 includes the two switch units SP1 and SP2. Thus, one of the switch units, for example SP1, is ordinarily used as a main circuit to supply power to the three-phase inverter circuit 42 and the redundant arm unit 43. Then, when the open failure occurs in the switch unit SP1, the other switch unit SP2 is used as a backup circuit so as to supply and shut off power to the three-phase inverter circuit 42 and the redundant arm unit 43. Therefore, it is possible to prevent the continuous stopped state of the motor driving circuit 32 due to the open failure of the power supply shutoff circuit 45.

Figure 8:
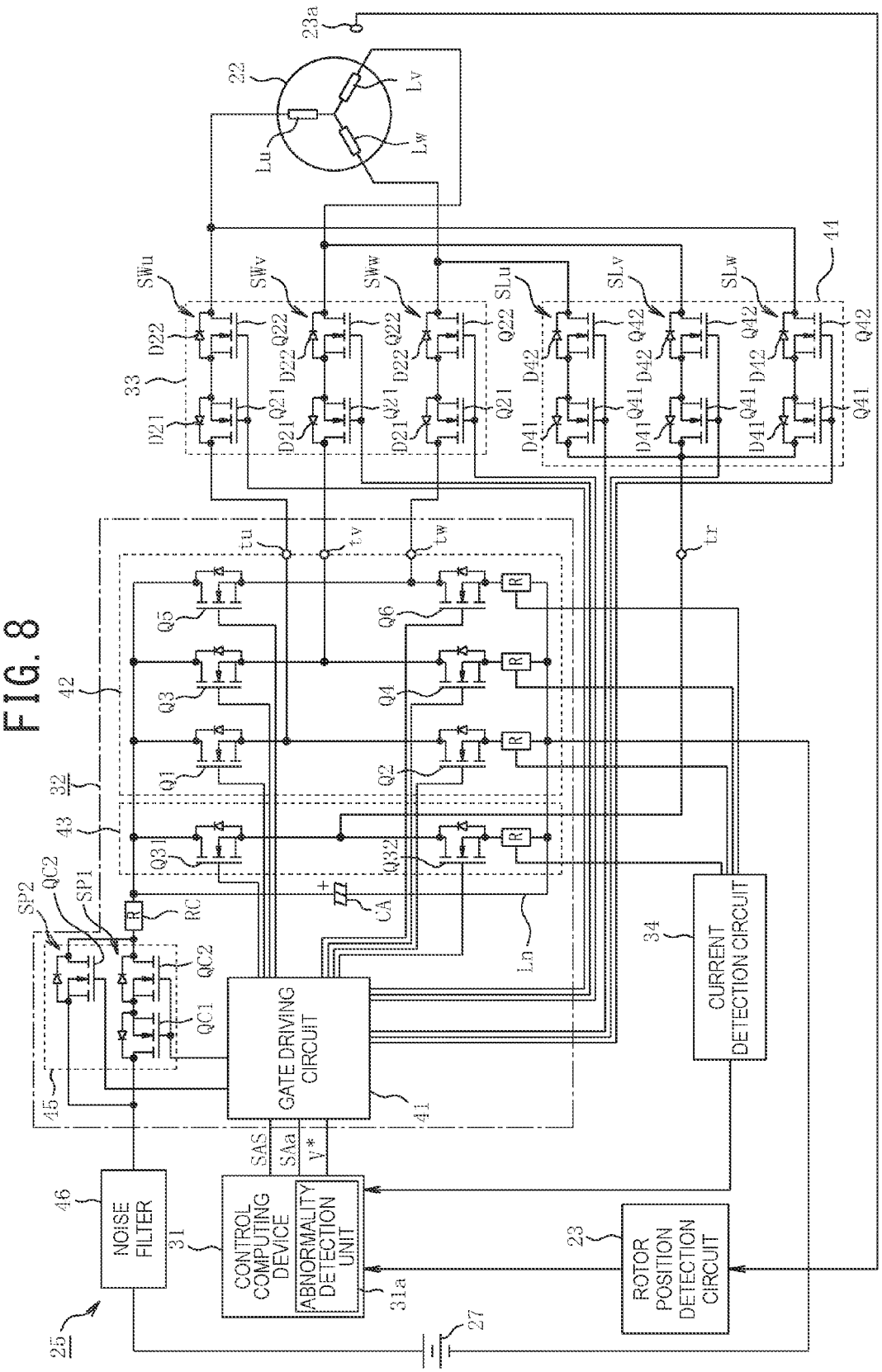
FIG. 8 is a circuit diagram illustrating a modification of the second embodiment.

It is to be noted that the description is made of a case where each of the two switch units SP1 and SP2 of the power supply shutoff circuit 45 includes the two field-effect transistors QC1 and QC2 connected in series with each other in the above-described second embodiment, however, the present invention is not limited thereto. That is, as to the switch unit SP2 on the backup side, the field-effect transistor QC1 for protection against reverse connection of the battery 27 may be omitted as illustrated in FIG. 8. It is to be noted that the voltage detection circuit 35u to 35w are not illustrated in FIG. 8, either.

In the case of FIG. 8, it is possible to reduce the number of the field-effect transistors for duplicating the power supply shutoff circuit 45, and to reduce manufacturing cost accordingly.

Next, the third embodiment of the present invention will be described with reference to FIG. 9.

In the third embodiment, the control computing device is duplicated.

Figure 9:
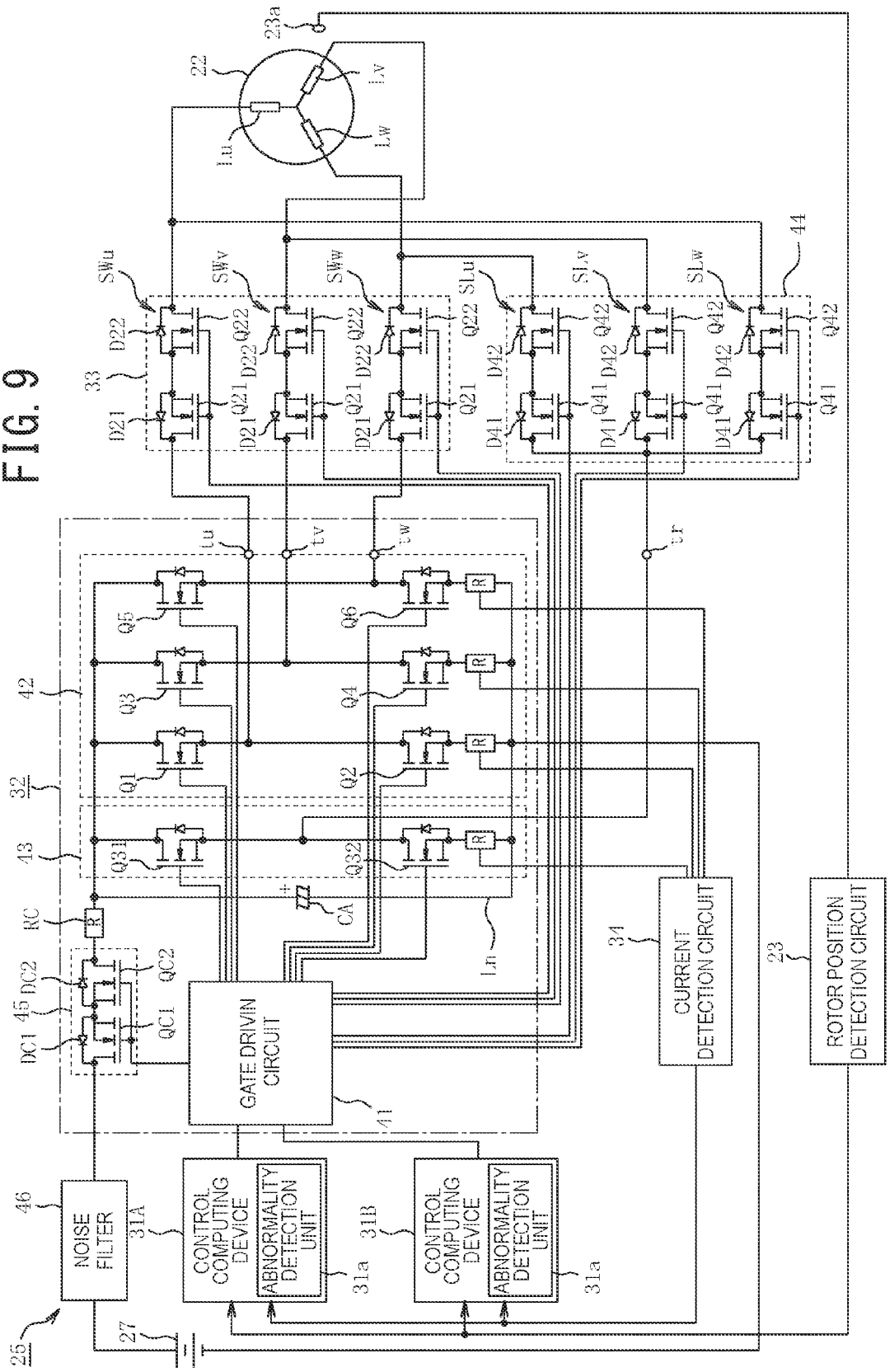
FIG. 9 is a circuit diagram illustrating a third embodiment of the present invention.

That is, in the third embodiment, two control computing devices 31A and 31B are provided as illustrated in FIG. 9. The steering torque T and the vehicle speed Vs are inputted to each of these control computing devices 31A and 31B. Furthermore, the rotor position signal θm detected by the rotor position detection circuit 23, the current detection value detected by the current detection circuit 34, and the voltage detection values detected by the voltage detection circuits 35u to 35w are inputted to the control computing devices 31A and 31B. It is to be noted that the voltage detection circuit 35u to 35w are not illustrated in FIG. 9.

Then, the control computing devices 31A and 31B monitor the computed results of each other, and one of them, for example, the control computing devices 31A is used as a main control computing device, and the control computing devices 31A is used as a sub control computing device. By replacing the control computing devices 31A in which an abnormality occurs by the control computing devices 31B, it is possible to obtain a fail-safe function.

In this way, according to the third embodiment, by duplicating the control computing device, it is possible to provide a motor control apparatus, an electric power steering apparatus and a vehicle with a higher reliability.

It is to be noted that the description is made of a case where the power supply shutoff circuit 45 includes the two switch unit SP1 and SP2 arranged in parallel with each other, and one of the switch units is set to a connected state in the ordinary-state and the other is set to the connected state when the abnormality occurs in the above-described second and third embodiment, however, the present invention is not limited thereto. That is, each of the two switch units SP1 and SP2 may be always set to the connected state, and any of the switch units SP1 and SP2 in which the abnormality occurs may be shut off when the abnormality occurs in any of them.

Figure 10:
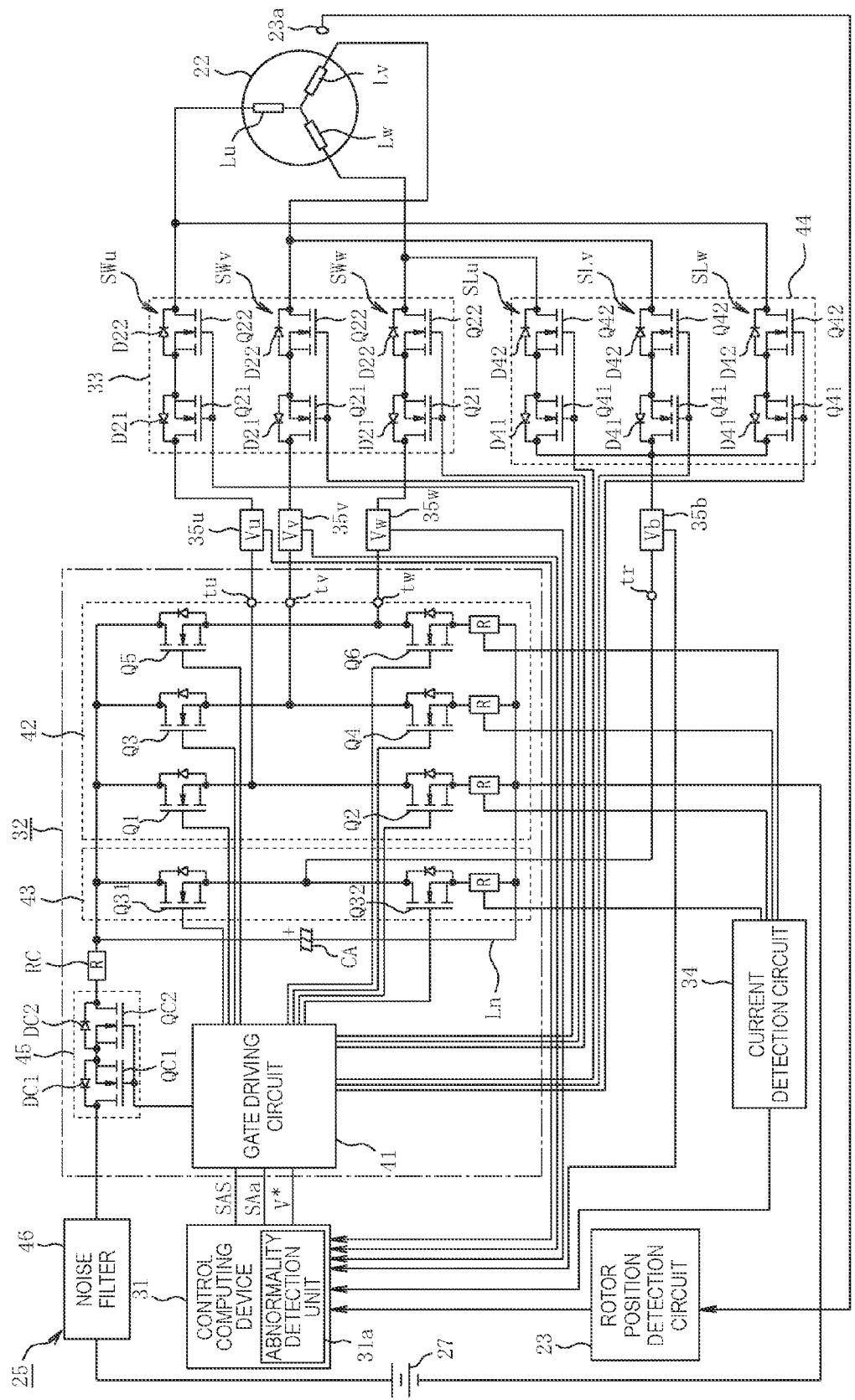
FIG. 10 is a circuit diagram illustrating a modification of the first embodiment of the present invention.

In addition, the description is made of a case where the redundant arm unit 43 includes the arm configuration of one phase of the three-phase inverter circuit 42 in the above-described first to third embodiments, however, the present invention is not limited thereto. The redundant arm unit 43 may include the redundant arms whose number is less than the number of the phases of the three-phase inverter circuit 42. In this case, when the number of the abnormal phase arms of the three-phase inverter circuit 42 is equal to or less than the number of the redundant arms, it is possible to replace the abnormal phase arms. Therefore, it is possible to further improve the reliability, as illustrated in FIG. 10.

In addition, the description is made of a case where the abnormality is detected only in the three-phase inverter circuit 42 in the above-described first to third embodiments, however, the present invention is not limited thereto. The voltage detection circuit 35b may be provided on an output side of the redundant arm unit 43 to diagnose an abnormality in the redundant arm unit 43.

In this case, when the steering wheel 1 is in a neutral state and a state in which the steering torque T detected by the steering torque sensor 13 is "0" continues for a predetermined period of time, the field-effect transistors Q31 and Q32 as the upper and lower arms of the redundant arm unit 43 is maintained to be in the OFF state. Then, in a state in which the respective phase switch units SLu to SLw of the connection selecting unit 44 is in the OFF state, an output voltage Vb of the redundant arm unit 43 detected by the voltage detection circuit is diagnosed. In this situation, when the output voltage Vb is a high level, it is determined that the short circuit failure occurs in the field effect transistor Q31 as the upper arm. When the output voltage Vb is a low level, it is determined that the short circuit failure occurs in the field effect transistor Q32 as the lower arm.

Next, when the field-effect transistor Q31 as the upper arm is set to be the ON state, the field-effect transistor Q32 as the lower arm is set to be the OFF state, and the output voltage Vb of the redundant arm unit 43 is not a high level, it is determined that the open failure occurs the field-effect transistor Q31 as the upper arm.

Furthermore, when the field-effect transistor Q32 as the lower arm is set to be the ON state, the field-effect transistor Q31 as the upper arm is set to be the OFF state, and the output voltage Vb of the redundant arm unit 43 is not a low level, it is determined that the open failure occurs the field-effect transistor Q32 as the lower arm.

In addition, in an abnormality diagnosis of the motor current shutoff circuit 33 and the connection selecting unit 44, the U-phase field-effect transistor Q1 as the upper arm of the three-phase inverter circuit 42 may be set to be in the ON state (or all upper arm transistors including the field-effect transistors Q3 and Q5 may be set to be in the ON state) in an ordinal running, for example a straight running steering or the like in which the assist current is set to zero.

Conversely, the field-effect transistors Q2, Q4, and Q6 as the lower arm are set to be in the OFF state, and the field-effect transistors Q31 and Q32 as the upper and lower arms of the redundant arm unit 43 are set to be in the OFF state. In this situation, first, each of the switch unit of the one phase of the motor current shutoff circuit 33, for example, the U-phase switch unit SWu and the U-phase switch unit SLu of the connection selecting unit 44 are both set to be the ON state, and it is confirmed whether or not the output voltage Vb of the redundant arm unit 43 becomes a high level. Then, it is confirmed whether or not the output voltage Vb of the redundant arm unit 43 becomes a low level by turning the motor current shutoff circuit 33 (SWu) to OFF. Furthermore, it is confirmed whether or not the output voltage Vb of the redundant arm unit 43 becomes a low level by turning the connection selecting unit 44 to OFF when the motor current shutoff circuit 33 (SWu) is in the ON state. Then, the above-described operation is performed for the V-phase switch unit SWv and the W-phase switch unit SWw in turns to detect the abnormality in the shutoff circuits of the respective phases.

Herein, the phase of the motor current shutoff circuit 33 and the phase of the connection selecting unit 44 turned to ON and OFF do not have to be the same.

In addition, the description is made of a case where the three-phase electric motor 22 is applied, and the three-phase inverter circuit 42 driving it is configured to have three phases, in the above-described first to third embodiment, but the present invention is not limited thereto. That is, when the electric motor having four or more phases is applied, the inverter circuit 42 having phase arms corresponding to the number of the phases. In accordance with this, the number of the phase of the redundant arm unit 43 may be set to be less than the number of the phases of the three-phase inverter circuit 42.

In addition, the description is made of a case where the motor control apparatus according to the embodiments is applied to the electric power steering apparatus in the above-described first to third embodiments, however the present invention is not limited thereto. The motor control apparatus according to the embodiments may be applied as a motor control apparatus for controlling an electric motor for an electric brake device, a power window device, a steering-by-wire system, or the like mounted on the vehicle.

REFERENCE SIGNS LIST 1 vehicle, 3 electric power steering apparatus, 11 steering wheel, 12 steering shaft, 13 steering torque sensor, 18 steering gear, 20 steering assist mechanism, 22 three-phase electric motor, 25 motor control apparatus, 26 vehicle speed sensor, 27 battery, 31 control computing device, 32 motor driving circuit, 33 motor current shutoff circuit, 34 current detection circuit, 35u to 35w voltage detection circuit, 41 gate driving circuit, 42 three-phase inverter circuit, 43 redundant arm unit, 44 connection selecting unit, 45 power supply shutoff circuit, 46 noise filter

The invention claimed is:

1. A motor control apparatus for controlling driving of a multi-phase electric motor, the motor control apparatus comprising:
a multi-phase inverter circuit including an arm configured to drive the multi-phase electric motor for each of a plurality of phases;
a motor current shutoff unit inserted between the multi-phase inverter circuit and the multi-phase electric motor to shut off a current for each of the plurality of phases;
a redundant arm unit including one or more arms whose number is less than the number of the plurality of phases of the multi-phase inverter circuit;
a connection selecting unit configured to select which one of windings of the multi-phase electric motor is to be connected to each of the one or more arms of the redundant arm unit;
an abnormal arm detection unit configured to detect an abnormality in each of the plurality of phases of the multi-phase inverter circuit; and
an abnormality control unit configured to control the motor current shutoff unit to shut off connection between an abnormal arm and the multi-phase electric motor when the abnormal arm detection unit detects the abnormal arm, and to control the connection selecting unit to connect at least one of the one or more arms of the redundant arm unit to a winding of the multi-phase electric motor, the winding being shut off by the motor current shutoff unit, wherein
the motor current shutoff unit includes a switch unit inserted between each of outputs of the multi-phase inverter circuit and each of the windings of the multi-phase electric motor, individually,
the switch unit includes two field-effect transistors connected in series with each other such that directions of parasitic diodes are opposite to each other, and
the multi-phase inverter circuit is connected to a direct current power supply via a power supply shutoff circuit having a duplicated system.

2. The motor control apparatus according to claim 1, wherein
the power supply shutoff circuit having the duplicated system includes two systems of switch units, the two systems being connected in parallel with each other, and
each of the switch units includes two field-effect transistors connected in series with each other such that directions of parasitic diodes are opposite to each other.

3. The motor control apparatus according to claim 1, wherein
the power supply shutoff circuit having the duplicated system is connected with a commonly used noise filter and a commonly used capacitor,
the commonly used noise filter is connected with the direct current power supply, and
the commonly used capacitor is connected with the multi-phase inverter circuit.

4. The motor control apparatus according to claim 1, wherein
an operation of a switching element included in the redundant arm unit and an operation of the connection selecting unit are diagnosed when the multi-phase inverter circuit is in a normal state.

5. The motor control apparatus according to claim 1, further comprising:
a redundant control system including a plurality of control computing units configured to control the multi-phase inverter circuit, wherein
the plurality of control computing units are configured to monitor each other, and
when any one of the plurality of control computing units fails, a normal control computing unit of the plurality of control computing units continuously controls driving of the multi-phase inverter circuit.

6. The motor control apparatus according to claim 1, wherein
the abnormal arm detection unit includes a current detection unit configured to detect a current flowing across each arm of the multi-phase inverter circuit and a current flowing across the redundant arm unit, individually.

7. The motor control apparatus according to claim 1, wherein
the abnormal arm detection unit includes a first voltage detection unit configured to detect output voltages of the multi-phase inverter circuit outputted to the multi-phase electric motor, individually.

8. The motor control apparatus according to claim 1, wherein
stator windings of the multi-phase electric motor include a plurality of winding units connected in parallel with each other for each of the plurality of phases.

9. An electric power steering apparatus comprising the motor control apparatus according to claim 1, wherein
the motor control apparatus includes an electric motor configured to generate a steering assist force to be applied to a steering mechanism.

10. A vehicle comprising an in-vehicle multi-phase electric motor driven by the motor control apparatus according to claim 1.

11. The motor control apparatus according to claim 2, wherein
one of the two systems of switch units on a backup circuit side has a configuration in which a field-effect transistor for protection against reverse connection of a battery is omitted.

12. The motor control apparatus according to claim 6, wherein
the abnormal arm detection unit includes a second voltage detection unit configured to detect an output voltage of each of the one or more arms of the redundant arm unit, individually.

* * * * *